United States Patent [19]

Johnson

[11] 4,313,460
[45] Feb. 2, 1982

[54] PILOT VALVE

[75] Inventor: Dwight N. Johnson, El Toro, Calif.

[73] Assignee: JH Industries, Inc., San Marcos, Calif.

[21] Appl. No.: 81,845

[22] Filed: Oct. 4, 1979

[51] Int. Cl.³ .................... G05D 16/00; F16K 31/365
[52] U.S. Cl. .................................. 137/489; 137/492; 137/505.34
[58] Field of Search .................. 137/489, 489.5, 492, 137/492.5, 82; 251/120; 137/505.34, 505.33

[56] References Cited

U.S. PATENT DOCUMENTS 2,877,791  3/1959  Rich .......................... 137/489.5 X
3,753,547  8/1973  Johnson .......................... 251/120

FOREIGN PATENT DOCUMENTS 894544  4/1962  United Kingdom ............... 137/489

Primary Examiner—Alan Cohan
Attorney, Agent, or Firm—Mason, Kolehmainen, Rathburn & Wyss

[57] ABSTRACT

A pilot valve designed to regulate a main liquid flow valve disposed in a fluid system is disclosed having a diaphragm and sliding poppet assembly which is biased in one direction by a reference force and movable in the opposite direction in response to variances in regulated pressure sensed upon the diaphragm. The pilot valve includes integrally formed self-cleaning restrictors which dampen the operation of the valve to eliminate chatter as the pilot valve throttles to maintain the desired liquid flow level in the fluid system. Stability during operation is provided by a positive feedback force being applied to the pilot poppet which is of the same magnitude as the pressure which positions the valve member of the main flow valve. This positive feedback force significantly reduces phase lag between the pilot and the main flow valve, thereby increasing valve response to load changes. The pilot valve may also be utilized in both pressure reducing and back pressure monitoring applications by the mere substitution of three internal parts, namely the valve seat insert, guide and a plunger or poppet.

16 Claims, 8 Drawing Figures

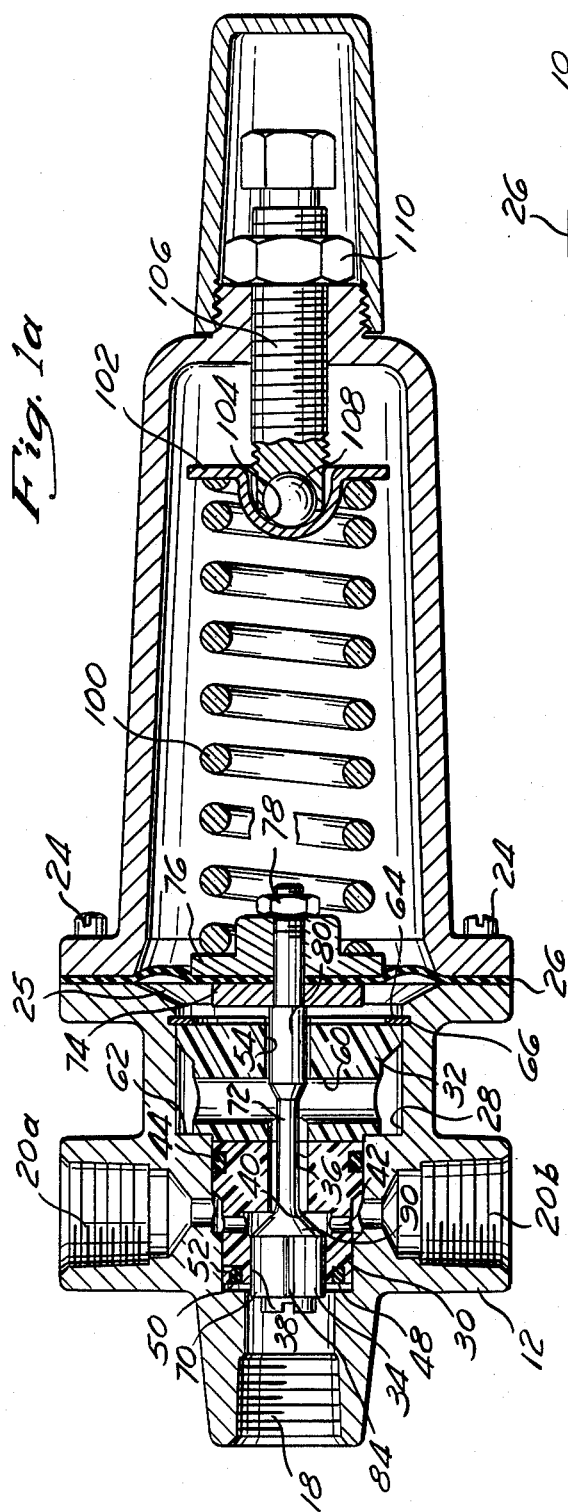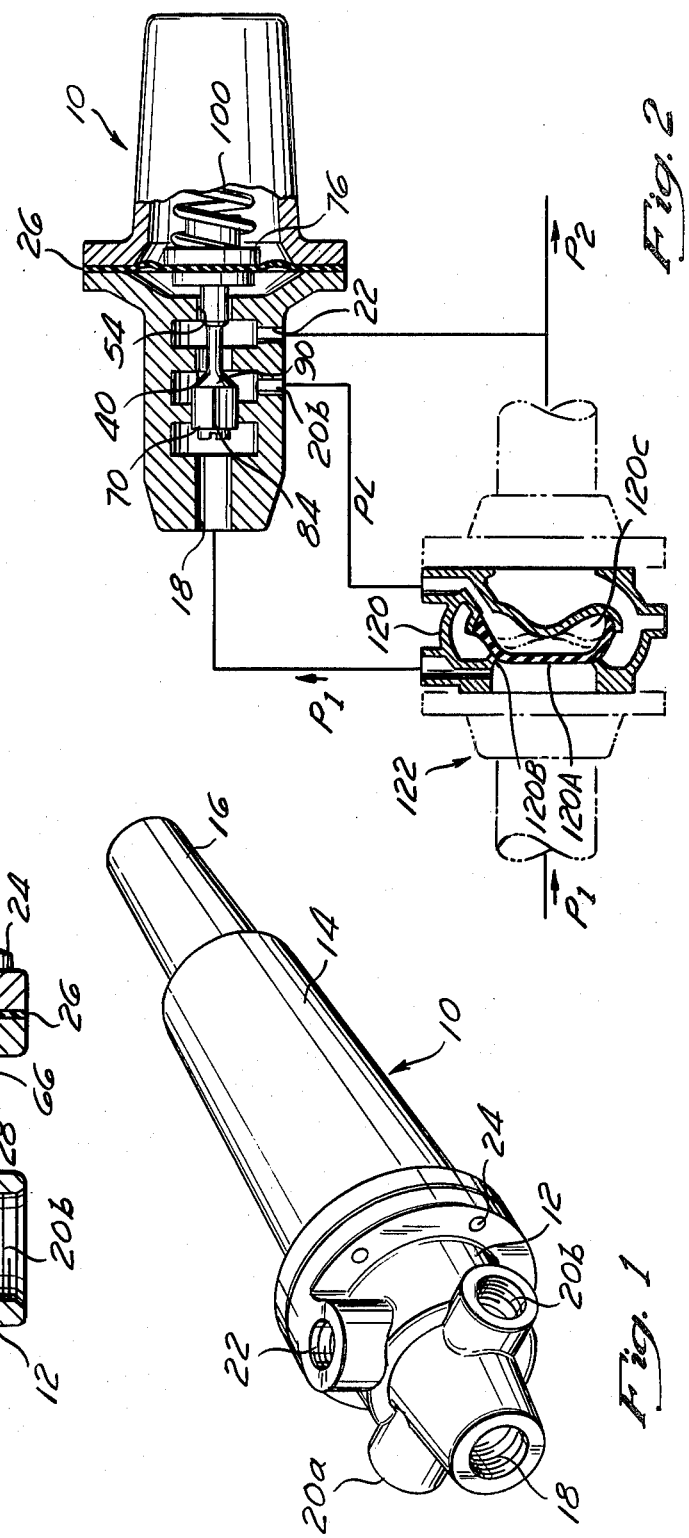

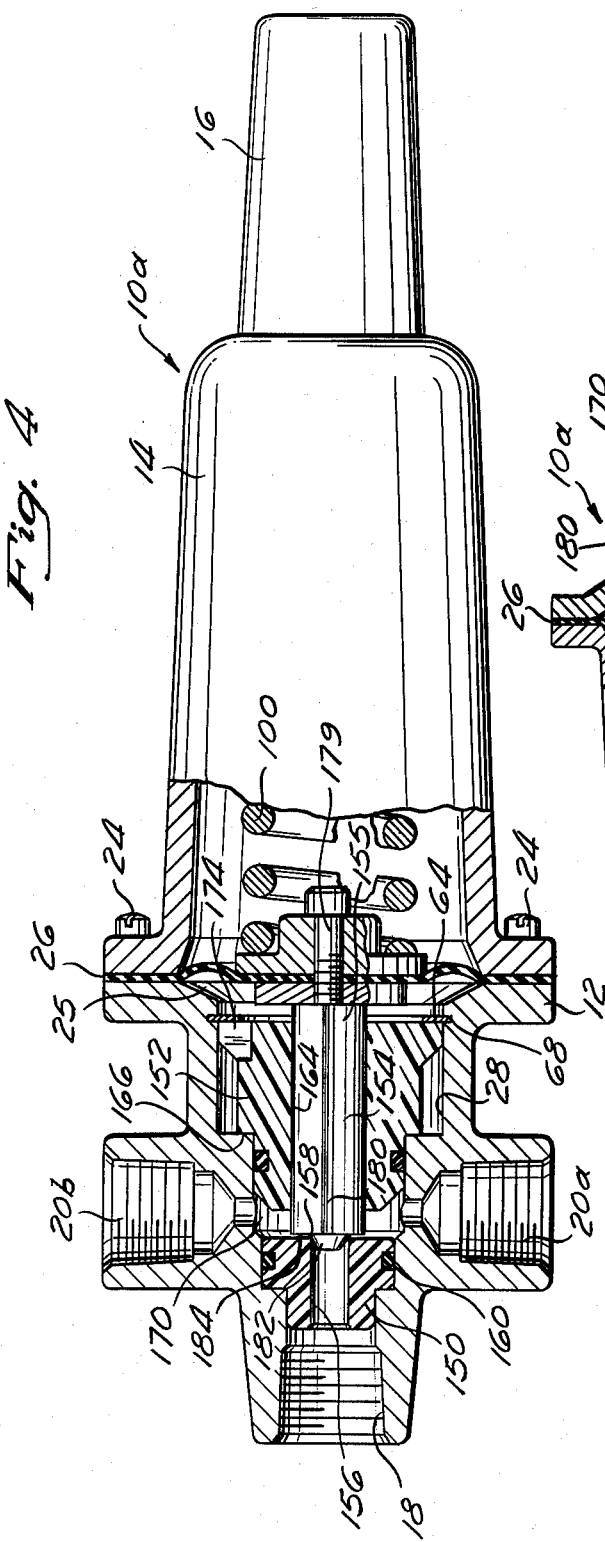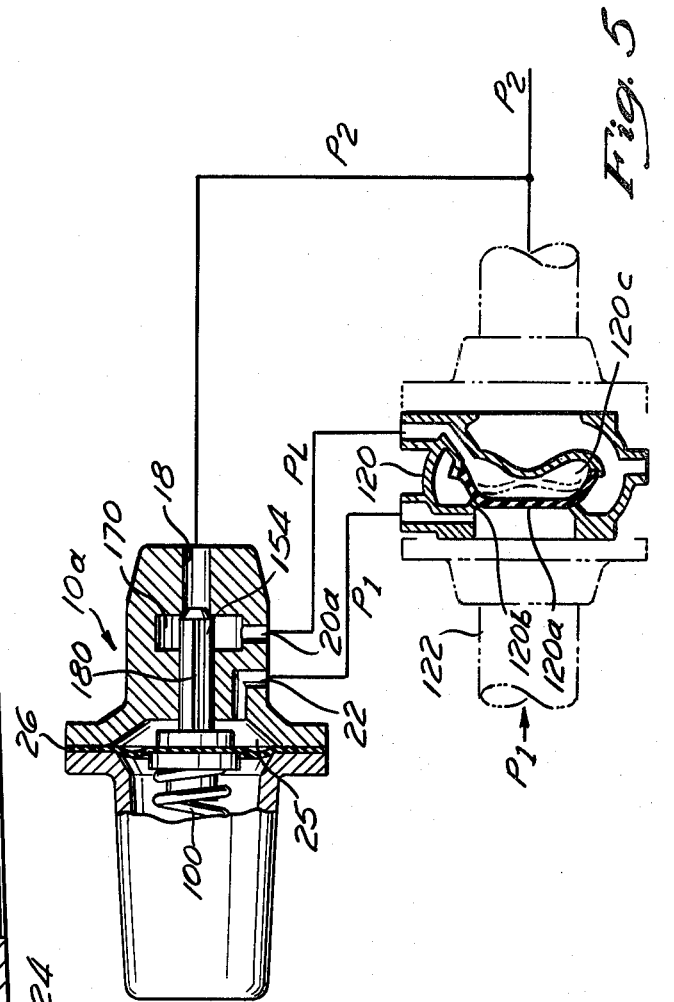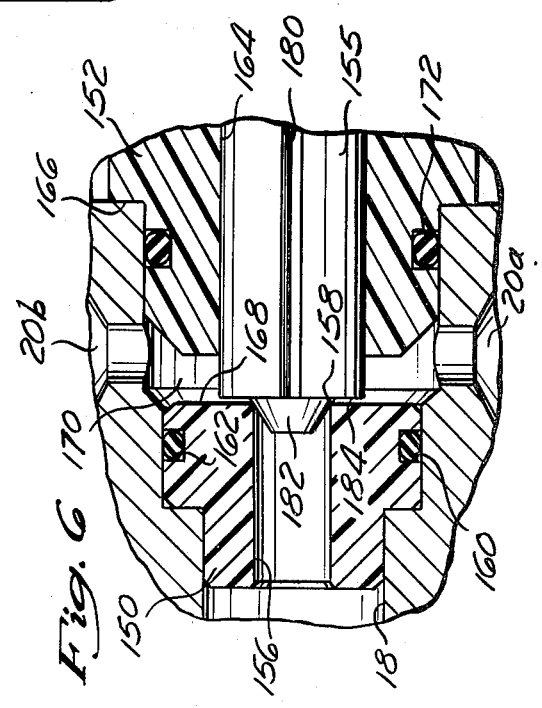

PILOT VALVE

FIELD OF THE INVENTION

The present invention relates to pilot valves for regulating or controlling the operation of a primary flow valve disposed within the fluid system and more particularly to a pilot valve which eliminates chatter and significantly decreases phase lag heretofore associated in pilot valve flow control systems.

BACKGROUND OF THE INVENTION

In large fluid flow systems, a main valve is typically disposed directly in the fluid line with the valve member being movable between an opened and closed position to meter flow across the valve. Although there are a variety of such main flow valves utilized in the valve art, one particular type typically used in large industrial and commercial applications, includes an elastomeric valve liner disposed transversely across the fluid flow path. This liner rolls back and forth over a plurality of radial slots formed in the valve body in response to variances in loading pressure applied to the opposite side of the liner thereby permitting monitored flow across the valve. Such a valve is disclosed in patent application Ser. No. 730,962, filed Oct. 8, 1976 by Dwight N. Johnson, and is marketed under the registered trademark "ROLL SEAL" by J H INDUSTRIES, Santa Ana, Calif.

In operation, such main flow valves, as well as other valves having similar loading pressure requirements, are regulated or controlled by a pilot valve which may be preset to operate the main flow valve in response to pressure changes sensed by the pilot valve at a desired location within the fluid system. Typically, the monitored pressure (i.e. the measured variable) in the fluid system is directed against a central piston or diaphragm of the pilot valve in opposition to a preset force such as a spring. For pressure reducing applications, the diaphragm or piston carries a valve member which travels to an open position when the monitored pressure acting upon the diaphragm falls below the preset force of the spring. This opening of the pilot valve vents the loading pressure applied to the liner of the main flow valve, thereby causing the main flow valve to open. The valving action of the main flow valve is usually progressive in nature such that as the pilot valve opens further, the main flow valve additionally opens further. Conversely as the pilot valve gradually closes, the main flow valve correspondingly closes in a proportional amount.

Although such prior art pilot valves have proven useful, they have been subject to inherent deficiencies which detract from their overall operation. The prior art pilot valves tend to be unstable during operation which often yields chattering, and there is undesirable phase lag between the sensing of pressure changes within the flow system and the response time in repositioning of the main valve, which often results in rather large variations in monitored system pressure.

In an attempt to eliminate the chattering deficiency associated in the prior art, many prior art pilot valve designs have included external means such as restrictor orifices and friction restrainers to dampen the operation of the pilot valve. However, such orifices and restrainers often become clogged by particulate matter carried within the main flow stream which prevents proper valve operation and, in severe instances, causes complete restrictor blockage.

Similarly, although the prior art pilot valve designs have recognized the undesirable phase lag between the sensing of pressure deviations in the regulated or monitored flow and the corresponding change in the loading pressure, attempts to correct the problem while maintaining valve stability have heretofore been unsuccessful. As a result, undesirably large variations in the regulated pressure within the main fluid system, which adversely affect the overall fluid system operation, are common in the prior art pilot valve fluid control systems.

Thus, there exists a present need in the valve art for a pilot valve regulator which may be effectively utilized to control the operation of the main flow valve disposed within the fluid system without producing chatter or yielding undesirable phase lag in operation.

SUMMARY OF THE PRESENT INVENTION

The present invention provides a significantly improved pilot valve which, when utilized to control the operation of the primary flow valve, substantially eliminates the chattering and phase lag deficiencies heretofore associated in the prior art. When used for pressure reduction, the pilot valve of the present invention incorporates a novel diaphragm/sliding poppet assembly which is provided with a self-cleaning restrictor across the poppet connecting upstream pressure to a chamber loading the pressure on the primary valve, and a self-cleaning restrictor leading to a diaphragm chamber controlling the position of the poppet.

The self-cleaning upstream restrictor is preferably a groove formed along the exterior of the poppet which, during reciprocal motion, brushes or wipes against an annular valve wall. As such, dirt particles accumulating within the restrictor groove are dislodged during successive movement or throttling of the poppet within the pilot valve. The self-cleaning restrictor leading to the diaphragm chamber is formed by sliding clearance between the poppet and a bushing guide, which, as with the upstream restrictor, utilizes the wiping action of the poppet to dislodge any dirt accumulating therein.

The frusto-conical shaped valve member of the pilot of the present invention produces a throttling gap between the valve member and seat which is in a form of a truncated cone. The smaller diameter of this truncated cone shape is established by the conical face of the poppet and thus varies in diameter and area as a function of poppet stroke; i.e., decreases in size as the poppet is stroked away from the seat. This area is acted upon by the differential pressure existing between upstream and downstream pressure to apply a closing bias to the poppet. As such, the reduced closing imbalance area produced during poppet opening decreases the closing bias applied to the poppet. This by itself is undesirable as tending to cause detenting. However, when open, the pilot valve of the present invention develops a pressure differential across its self-cleaning upstream restrictor between the upstream pressure and the main valve loading pressure which yields a positive feedback force to the pilot poppet that increases the closing bias on the poppet. Thus, this feedback force offsets the decreasing closing bias caused by the reduced imbalance area which occurs as the poppet is opening. The magnitude of this feedback force is the same as the pressure differential that positions the liner of the main flow valve which ensures that the full feedback force will not be developed until the main or primary valve has repositioned. As such, main flow valve response to variances in the monitored system pressure is faster thereby reducing phase lag in the system.

The pilot valve may also be utilized for back pressure regulation control system merely by interchanging the valve seat insert, guide bushing and plunger or poppet. As such, the pilot valve meets the versatility requirements of the industry and may rapidly be adapted to meet the desired control function. In the back pressure controlling mode, upstream line pressure is applied to the pilot valve diaphragm chamber, which in turn is connected to a loading pressure chamber by means of a self-cleaning restrictor groove in the exterior of a valve plunger attached to the diaphragm.

DESCRIPTION OF THE DRAWINGS

These and other features of the present invention will become more apparent upon reference to the drawings wherein:

FIG. 1 is a perspective view of the pilot valve of the present invention illustrating the configuration of the body casting, spring housing, and the external location of the ports thereon;

FIG. 1a is an enlarged cross-sectional view of the pilot valve on lines 1a—1a of FIG. 1 illustrating the poppet and bushing guide assembly utilized in pressure reducing applications;

FIG. 2 is a schematic representation of the pilot valve of FIG. 1a connected to a primary flow valve and disposed to regulate downstream pressure.

FIG. 4 is a partial cross-sectional view of the pilot valve of the present invention utilized for back pressure regulation illustrating the interchangeable valve plunger, valve seat and guide bushing disposed therein;

FIG. 5 is a schematic view of the pilot valve of FIG. 4 connected to a main flow valve to regulate system back pressure; and FIG. 6 is an enlarged partial cross-sectional view of the valve plunger of FIG. 4 showing the detailed construction thereof.

DETAILED DESCRIPTION OF THE PREFERRED EMBODIMENT

Figure 3:
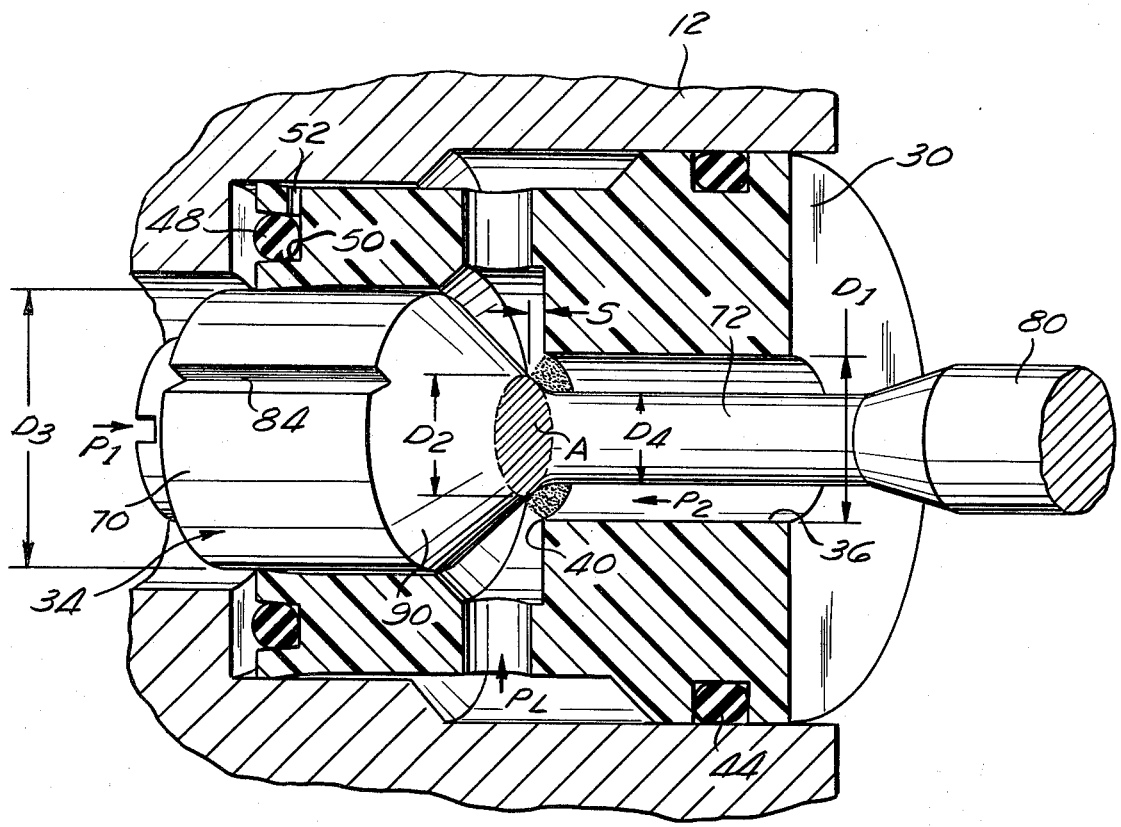
FIG. 3 is an enlarged partial cross-sectional view of the frusto-conical-shaped valve member of FIG. 1a and depicting the truncated cone throttling gap formed thereby.

Referring to FIG. 1, there is shown the pilot valve 10 of the present invention which may be utilized in both pressure reducing and back pressure monitoring fluid control systems. The valve 10 is composed generally of a body casting 12 and spring housing 14 which are preferably fabricated from brass, and rigidly interconnected adjacent one end thereof as by way of a plurality of fasteners 24 (shown in FIG. 1a). The distal end of the spring housing 14 additionally includes a seal cap or bonnet 16 which is removably mounted thereto to obtain access to the spring tension adjustment assembly (FIG. 1a).

Four aperture ports, 18, 20a, 20b, and 22, are formed in the body casting 12 and are internally threaded to receive standard pipe fittings thereby facilitating easy installation of the pilot valve 10 within the main fluid system. Each of these ports 18, 20a, 20b, and 22 provide flow passages which extend within the interior of the body casting 12 with the ports 20a and 20b being duplicate ports.

PRESSURE REDUCING PILOT VALVE

Referring to FIG. 1a, the body casting 12 and spring housing 14 mount at their interface an elastomeric diaphragm 26 which isolates the body casting 12 from the spring housing 14 and forms a diaphragm chamber 25. An axially extending central flow cavity 28 is formed within the interior of the body casting 12 into which extend the ports 18, 20a, 20b, and 22. Disposed within this cavity 28 are a valve seat insert 30, a guide bushing 32, and a poppet 34, which cooperate with one another to perform the valving action of the pilot valve 10.

In the preferred embodiment, the valve seat insert 30 is fabricated from a polytetrafluoroethylene material such as "Teflon", a registered trademark of E. I. DuPont De Nemours, and includes a pair of co-axial apertures 36 and 38 which form at their junction an annular valve seat 40. A flow channel 42 extends radially through the insert 30 to provide flow communication between the aperture 38 and the ports 20a and 20b formed within the body casting 12. The exterior of the valve insert 30 is sealed to the interior flow cavity 28 adjacent opposite ends thereof by a pair of O-rings 44 and 48.

As best shown in FIG. 3, the O-ring 44 extends in a typical manner about the circumference of the valve insert 30 whereas the O-ring 48 is disposed within an annular groove 50 formed upon the end face of the seat insert 30. The width of this groove 50 is sized to be slightly less than the cross-section of the O-ring 48, such that upon insertion of the O-ring 48 therein, the outer circumference of the insert 30 spreads radially outward while the inner circumference deforms radially inward. By such a design, the distal end of the seat insert 30 sealingly engages both the flow cavity 28 as well as the poppet 34. To aid in the insertion of the O-ring 48 into the annular recess 50, a small vent aperture 52 is produced which extends radially outward from the interior of the recess to expell air displaced within the groove 50 during assembly.

The guide bushing 32 is preferably formed of a polyacetal material such as Delrin (A registered trademark of E. I. DuPont De Nemours) and includes an axial aperture 54 which is aligned with the aperture 36 formed in the seat insert 30. The diameter of this aperture 36 is sized slightly greater than the diameter of the shoulder 80, formed on the poppet 34, which permits fluid flow to be directed against the diaphragm 26 and additionally forms a self-cleaning restrictor feature of the present invention (to be discussed in more detail below).

As with the seat insert 30, the bushing guide 32 includes a radially extending flow channel 60 to permit fluid communication with the port 22 of the body casting 12. The guide bushing 32 is biased against a shoulder 62 formed within the flow cavity 28 and directly abuts the seat insert 30 adjacent one end thereof. Both the guide bushing 32 and seat insert 30 are maintained in their appropriate position within the flow cavity 28 by a retainer or snap ring 64 which mates with an annular groove 66 formed in the body casting 12.

The poppet 34, preferably fabricated from steel, is formed having an enlarged cylindrical end portion 70 and an elongate stem portion 72. The stem portion 72 extends through the axial apertures 36 and 54 formed within the seat insert 30 and guide bushing 32, respectively, and is mounted adjacent its distal end to the diaphragm 26 as by way of the lower and upper diaphragm plates 74 and 76 and a retaining nut 78. The lower diaphragm plate is axially located upon the poppet stem 72 by abutment with the shoulder 80 formed adjacent the distal end of the stem 72. As such, by the manual tightening of the nut 78, the diaphragm 26 is compressed between the lower and upper diaphragm plates 74 and 76, respectively, and forms a liquid-tight seal about the circumference of the poppet stem 72.

The diameter of the enlarged end portion 70 of the poppet 34 is sized to be slidingly received yet sealingly engaged within the aperture 38 formed in the seat insert 30 and includes a V-shaped groove 84 which extends throughout its length. As will be explained in more detail below, this groove 84 is preferably formed having a 60-degree included angle and forms the self-cleaning upstream restrictor for the pressure reducing pilot 10, thereby providing restricted flow communication between the port 18 and ports 20a and 20b. The transition between the enlarged end portion 70 of the poppet 34 and the stem 72 is fabricated in a frusto-conical configuration, which forms the valving member 90 for the pilot valve 10 to selectively engage the valve seat 40 formed on the seat insert 30.

The spring housing 14 axially mounts a compression spring 100 which is located between the upper diaphragm plate 26 and a spring pad 102. As shown, the spring pad 102 includes a semi-circular recess 104 which receives one end of a tension adjusting screw 106 threadingly mounted adjacent the distal end of the spring housing 14. The adjusting screw 106 includes a ball member 108 swaged into its end which mates with the semi-circular recess 104 of the spring pad 102. As will be recognized, by manually turning the adjustment screw 106, the amount of force or tension exerted by the spring member 100 against the diaphragm 26 may be varied and subsequently maintained during valve operation by the tightening of the lock nut 110 against the end of the spring housing 14.

By this particular construction, it will be recognized that the spring 100 biases the diaphragm 26, and thus the poppet 34, into an open position, i.e. tends to move the valve member 90 away from the valve seat 40. In opposition to the spring forces exerted on the diaphragm 26 are the fluid pressures applied at the port 18 which acts upon the area of the enlarged portion 70 of the poppet 34 and the pressure applied to the port 22, which acts upon the area of the diaphragm 26 through the clearance in the aperture 54 of the bushing guide 32. When the pressure exerted on the poppet 34 and diaphragm 26 exceeds the force exerted by the spring 100, the poppet 34 moves from left to right, as viewed in FIG. 1a, to contact the valve member 90 against the valve seat 40 and cause the pilot valve 10 to close.

OPERATION OF VALVE OF FIG. 1a

With the structure defined, the operation of the pressure reducing pilot valve 10 of the present invention may be described. FIG. 2 schematically illustrates the installation of the pressure reducing pilot valve 10 within a typical fluid system 122 (represented by phantom lines) utilized to control the operation of a main or primary flow valve 120. In this fluid system 122, incoming or upstream fluid pressure to the main or primary flow valve 120 is designated by the numeral P1, downstream fluid pressure is designated by the numeral P2; and the main valve control or loading pressure is designated by the numeral PL.

As a preliminary note, it will be understood that the main flow valve 120 opens and closes in response to variances in the loading pressure PL which causes its elastomeric liner 120A to move toward and away from its seat 120B and meter upstream fluid flow across the valve 120. A more detailed description of the operation of the main flow valve 120 is contained in United States Patent Application, Ser. No. 730,962, filed Oct. 8, 1976 by Dwight N. Johnson, the disclosure of which is expressly incorporated herein by reference.

As shown, the pilot valve 10 is installed within the flow system 122 with the incoming pressure P1 being directed to the port 18, the loading pressure PL being applied to the port 20b and the downstream pressure P2 being directed to the port 22. It will be noted that the pilot valve 10 is conveniently connected within the system 122, using standard pipe connections (not shown), and without the requirement of separate static lines, external restrictors, or "Tee" connections.

The basic function of the pressure reducing pilot 10 of the present invention in the flow system 122 of FIG. 2 is to maintain a substantially constant downstream pressure P2. As such, it is necessary for the pilot 10 to provide a proportional main valve loading differential pressure, i.e., from upstream pressure P1 to loading pressure PL, as a function of changes in the downstream pressure P2.

This function of the pilot 10 is provided in the following manner. With the spring 100 of the pilot valve 10 preset to maintain a desired value of downstream pressure P2, upstream pressure P1 acts upon the poppet 34 through the port 18 whereas downstream pressure P2 acts upon the diaphragm 26 through the port 22 and the clearance aperture 54 formed in the bushing guide 32. When the upstream pressure P1, and downstream pressure P2, acting upon the poppet 34 and diaphragm 26, respectively, are of sufficient magnitude to overcome the spring force 100, the poppet 34 moves from left to right in FIG. 2, wherein the valve member 90 engages the valve seat 40 and closes the pilot valve 10.

In this closed position, upstream pressure P1 flows through the restrictor groove 84 of the poppet 34, causing a dampened rise in the loading pressure PL applied to the main valve control chamber 120c. During this loading pressure rise, the main valve liner 120a moves from its open position, indicated by the phantom line in FIG. 2, to a closed position, when the loading pressure PL equals the inlet pressure P1, as indicated by the solid line in FIG. 2.

As increased downstream flow demands occur within the flow system 122, the attendant decrease in the downstream pressure P2 is communicated to the diaphragm diaphragm 26 through the restrictor formed by the sliding clearance between the aperture 54 in the bushing guide and the poppet stem 72. As such, the decreased downstream pressure P2, sensed by the diaphragm 26, is dampened, thereby reducing the possibility of chattering within the pilot valve 10. In response to the decrease in the downstream pressure P2 the spring forces of the pilot valve 10 shift the poppet 34 in a direction from right to left in FIG. 2 thereby lifting the conical shaped valve member 90 off of the valve seat 40 and opening the pilot.

During this opening of the pilot valve 10, the loading pressure PL is vented across the valve seat 40 and into the downstream line thereby causing the liner 120a of the main valve 120 to move off its seat 120b and permit flow across the main valve 120. The flow across the main valve 120 raises the downstream pressure P2 back to its desired level wherein the increased downstream pressure P2, sensed by the diaphragm 26, causes the poppet to again shift back toward the valve seat 40, thereby raising the loading pressure PL to a level wherein the main valve 120 moves toward the closed position. Thus, it will be recognized that the pilot valve 10 provides a control loop system wherein sensed changes or variances in the downstream pressure P2 produce a proportional change in the loading pressure PL, to meter fluid flow across the main valve 120.

From the above, it is evident that, in the present invention, increases in the valve loading pressure PL and variances in the downstream pressure P2 are communicated in a restricted manner to the main valve 120 and pilot diaphragm 26, respectively. As previously mentioned, such restricted flow communication prevents chattering of the pilot valve 10 during operation by dampening the movement of the poppet 34 in response to pressure changes. It is an important feature of the present invention that both the restrictors of the pilot valve 10 are self-cleaning, thereby minimizing the possibility of dirt accumulation therein which would detract from the overall valve operation.

This particular self-cleaning feature is made possible by the incorporation of the restrictors at internal locations within the pilot valve whereby the cyclic movement of the poppet 34 may be utilized to dislodge any dirt particles accumulating within the restrictors. As shown in FIGS. 1a and 3 in the preferred embodiment the poppet 34 includes an axially extending upstream restrictor groove 84 which is integrally formed upon the exterior of the enlarged portion 70 of the poppet 34. Due to the O-ring 48 causing the end face of the seat insert 30 to tightly engage the enlarged end portion 70 of the poppet 34 in a manner previously described, during successive axial movement of the poppet 34 the inner edge of the end face of the seat insert 30 brushes or wipes against the poppet 34. This wiping action has been found to effectively dislodge any dirt particles or other foreign substances that have entered into the restrictor from the upstream fluid system, thereby insuring that the restrictor groove 84 constantly remains clear.

Similarly, the other restrictor is formed by a sliding clearance between the poppet stem 72 and the aperture 54 in the bushing guide 32. Since the poppet 34 reciprocates within the aperture 54, any dirt particles lodging within the sliding clearance are cleared during successive operations of the valve and are free to pass through the port 22 and back into the downstream flow system.

The self-cleaning upstream restrictor in combination with a frusto-conical shaped valving member 90 significantly eliminates the phase lag heretofore associated in the prior art pilot valve designs. This may be described with reference to FIG. 3 wherein the pressures, acting upon the poppet 34, are schematically illustrated.

As will be recognized, in the pressure-reducing control system of FIG. 2, the upstream pressure P1 is consistently at a value greater than the regulated downstream pressure P2 and hence a pressure differential from P1 to P2 exists across the poppet 34. With the poppet 34 in a closed position, the loading pressure PL will increase to the level of P1. Thus, in that condition it may be seen that the upstream pressure P1 acts upon the area formed by enlarged diameter D3 of the poppet 34 minus the annular area D3–D1, or in other words P1 acts on the D1 area. The poppet also receives force from the downstream pressure P2 acting upon the area formed by the difference in the diameter D1 (i.e. the diameter of the valve seat 40) and the diameter D4, as well as other force from P2 applied to other surfaces of the poppet and to the diaphragm, and the force of the loading spring. When the valve poppet 34 is stroked away from the seat 40 through a distance S, a throttling gap (represented by the shaded area in FIG. 3) is produced between the frusto-conical shaped valve member 90 and the valve seat 40, the configuration of which is a truncated cone having a base diameter D1, a top diameter D2 defining an area A, and a height S (i.e., the stroke of the poppet 34).

Due to this throttling gap, during movement of the poppet 34 off of the seat 40 (i.e., to an open position), the effective area upon which the upstream pressure P1 acts upon is reduced to area A. Similarly, the area on which the downstream pressure P2 acts, is reduced from its initial area defined by the difference in the diameters D1 and D4, to a smaller area defined by the difference between the reduced diameter D2 and the diameter D4. That is, diameter D2 and area "A" both decrease as the poppet is stroked further away from the pilot valve seat 40, decaying to a minimum area defined by the diameter D4 of the poppet stem 72. Thus, during the opening of the pilot valve 10, both P1 and P2 are applied to decreasing areas; and during closing, the reverse is true. This tends to make the poppet detent to open and closed positions, which is undesirable.

However, the present invention provides for pilot circuit flow and the development of a pressure differential between the upstream pressure P1 and the main valve loading pressure PL across the self-cleaning restrictor groove 84, which results in forces offsetting the detenting tendency. During movement of the poppet 34 away from the closed position against the seat 40, the loading pressure PL is vented across the valve seat 40 to the downstream pressure P2. As such, a pressure differential between the upstream pressure P1 to the main valve loading pressure PL exists which acts upon the annular area difference between the diameters D3 and D2. This differential creates a closing force on the poppet which increases as the poppet opens and decreases as the poppet closes, which is in addition to the P1–P2 differential applied to area A. This additional force opposes the detenting tendency, since it increases as area A decreases and decreases as A increases. The differential is in effect a positive but varying feedback force urging the poppet toward its closed position that stabilizes the operation of the poppet.

It will be recognized that this positive feedback force is a function of the actual loading pressure PL which positions the liner 120c of the main valve 120 of the flow system 122. Consequently, the pilot valve is very responsive and thereby causes the main flow valve 120 to respond to changes in the downstream pressure P2 faster and minimizes phase lag in the system.

Figure 3A:
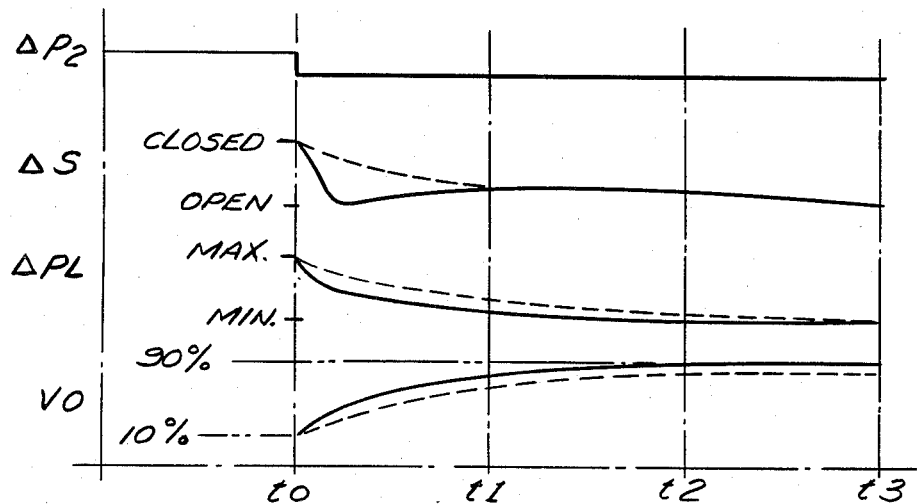
FIG. 3a is a graph illustrating the significant improvement in operation between the pilot valve of the present invention and the typical prior art pilot valve.

The dramatic difference between the operation of the pressure reducing pilot 10 of the present invention and those of the prior art are illustrated graphically in FIG. 3a, wherein the change in poppet strokes, loading pressure PL, and opening of main valve liner 120a in response to a step change in the measured variable ΔP2, i.e., downstream pressure P2, is presented with respect to time. For purposes of FIG. 3, it is assumed that at a time (t) equals zero, there has occurred a stepped reduction in the downstream pressure P2 which is sensed by the diaphragm 26 of the pilot valve 10. For both the poppet stroke S, loading pressure change ΔPL, and main valve opening VO, the solid line represents the functioning of the pilot valve 10 of the present invention, whereas the phantom lines represent typical prior art pilot valve designs.

With reference to the poppet stroke, it may be seen that in the prior art valve, upon sensing a decrease in the measured variable, the poppet gradually moves from a closed to opened position reaching its maximum stroke at approximately a time interval of T=3. Such gradual increase graphically illustrate the phase lag between the sensing of the downstream pressure drop and the pilot valve response thereto. In contradistinction, it may be seen that with the pilot valve 10 of the present invention, upon sensing the drop in the downstream pressure P2, the poppet stroke rapidly moves to a maximum open value and then gradually moves back toward a closed position. This gradual climb back to a closed position is produced by the positive feedback differential between the upstream pressure P1 acting upon the diameter D3 and the pressure PL acting on the annular difference between the diameters D2 and D3 in a manner previously described. As such, the phase lag in the pilot valve 10 poppet response to the change in the measured variable is substantially reduced in the present invention.

In reference to the change in loading pressure ΔPL, it may be seen that the prior art pilot valve produces a slow decay in the loading pressure PL which obtains its lowest value at time T=3. In contradistinction, the loading pressure PL, made possible by the pilot valve of the present invention, renders a lower value for the loading pressure at any given instant of time. Such a lower value for the loading pressure PL permits a more rapid buildup of the measured variable P2 thereby decreasing the magnitude of fluctuation in the downward pressure P2.

The main valve opening differences between the prior art and the present pilot valve are basically mirror images of the loading pressure change PL and, as may be seen, are substantially greater for the pilot valve of the present invention than in the prior art. As such, it is evident that the pilot valve 10 of the present invention provides a significant improvement in the flow control systems wherein the phase lag between sensing of a pressure change in the measured variable and the proportional response of the main flow control valve is reduced.

BACKPRESSURE MONITORING PILOT VALVE

Referring to FIG. 4, there is shown the alternative embodiment of the pilot valve 10a of the present invention adapted to be utilized in back pressure monitoring flow control systems. As may be recognized, the back pressure pilot valve 10a utilizes the same body casting 12, spring housing 14, and spring diaphragm assembly 26 and 100, as utilized in the pressure reducing pilot valve 10 previously described, with the only modification being in the configuration of the valve seat insert 150, bushing guide 152, and plunger 154, maintained within the internal flow cavity 28 of the body casting 12.

As shown, the valve seat insert 150 has a substantially T-shaped cross-sectional configuration and includes an axial aperture 156 extending throughout its length. This aperture 156 communicates with the port 18 adjacent one end thereof and forms a valve seat 158 at its opposite end. The insert 150 is preferably formed of a polyacetal material such as Delrin which has been found to possess suitable strength to prevent degradation of the valve seat 158 during prolonged use. As in the previous pressure reducing pilot valve embodiment, the valve seat insert 150 of the back pressure pilot valve is sealed against the annular wall of the internal flow cavity 28 by an annular O-ring 160 which is maintained within the groove 162 formed about its maximum circumference.

The bushing guide 152 is additionally formed in a generally T-shaped cross-sectional configuration and is similarly fabricated from a polyacetal material such as Delrin. A central aperture 164 extends axially through the insert 152 which is aligned with the central aperture 156 of the valve seat insert 150. As best shown in FIG. 6, the guide bushing 152 includes an annular shoulder 166 which directly abuts the increased diameter portion of the internal flow cavity 28. With the shoulder 166 abutted there against, the end of the guide bushing 152 is spaced from the end face 168 of the valve seat insert 150, thereby defining an enlarged loading pressure chamber 170 which communicates with the ports 20a and 20b. The chamber 170 is sealed from diaphragm 26 by an annular O-ring 172 which tightly engages the cylindrical walls of the flow channel 28. To provide flow communication between the port 22 (shown in FIG. 1) with the diaphragm 26, the guide bushing 152 includes an enlarged recess 174 adjacent its distal end which extends radially inward partially through its cross-section. As in the previous pressure reducing pilot 10, the guide bushing 152 is maintained in its desired position by the retainer ring 64 which is received in the annular groove 66 formed in the body casting 12.

The plunger 154 is formed having a generally barrel-like portion 155, the outside diameter of which is sized slightly less than the diameter of the axial aperture 164 of the bushing guide 152 to permit the plunger 154 to slide therein yet large enough to provide a substantially liquid-tight seal thereabout. One end of the plunger 154 receives a cap screw 179 which extends through the diaphragm 26 and is sealingly mounted thereto in a manner previously described. The opposite end of the plunger 154 includes a small conical-shaped projection 182, the maximum diameter of which is slightly larger than the diameter of the annular valve seat 158 formed in the valve seat insert 150. By such a configuration, the conical face 182 of the plunger 155 forms the valve member of the pilot valve 10a and selectively engages the valve seat 158 formed on the valve seat insert 150. With the plunger, the large end face area 184 normally spaced from the annular seat.

A "V"-shaped channel 180 is formed along the exterior of the barrel portion 155 and extends axially throughout its length. As may be recognized this channel 180 provides restrictive flow communication between the diaphram 26 and the enlarged loading pressure chamber 170 thereby forming a self-cleaning upstream restrictor.

Referring to FIG. 5, the installation of the back pressure monitoring pilot 10a of the present invention within a fluid system 122 (represented by the phantom lines) is illustrated schematically. The fluid system 122 utilizes the same type of main flow valve 120 as in the pressure reducing system of FIG. 2, having an elastomeric liner 120a, a seat 120b, and a loading pressure control chamber 120c. For convenience, the upstream, downstream and loading pressures are designated P1, P2, and PL, respectively.

In the back pressure regulation system, the main function of the pilot 10a is to provide a variable loading pressure PL in response to variances in the upstream fluid pressure P1, such that a substantially constant value of upstream pressure P1 is maintained. Thus, the pilot valve 10a is utilized to yield pressure limiting throttling control of upstream pressure P1.

As shown in FIG. 5, in this back pressure application, the pilot 10a is disposed in a 180-degree orientation from that of the previous pressure reducing system (FIG. 3) with the upstream pressure P1 being directed to the diaphragm 26 through the port 22, the loading pressure PL being applied to the loading pressure chamber 170 through the port 28 and the downstream pressure P2 being applied to the port 18.

In operation, the force exerted by the spring 100 is set to a desired level which tends to drive the plunger 154 into a closed position, as indicated in FIG. 5. In this closed position, incoming pressure P1 is metered through the upstream restrictor 180 and into the enlarged loading pressure chamber 170, causing a dampened rise in the loading pressure PL. Due to this rise, the liner 120a of the main flow valve 120 moves from its open position, indicated by the phantom lines in FIG. 5, to a closed position when the loading pressure PL equals the upstream pressure P1, as indicated by the solid lines in FIG. 5.

Subsequently, as a rising inlet pressure P1 is sensed upon the diaphragm 26, the increase in the upstream pressure P1 overcomes the opposing force of the spring 100 causing the plunger 154 to move off the seat 158 and into an open position. During this travel of the plunger 154 (from right to left in FIG. 5), the loading pressure PL is rapidly vented from the enlarged loading pressure chamber 170 through the port 18 and into the downstream line P2. This venting results in a corresponding reduction in the loading pressure PL applied to the liner 120a of the main flow valve 120 and allows upstream fluid to pass across the main flow valve 120.

As the upstream pressure decreases to the set point of the pilot 10a, the reduction in upstream pressure P1, sensed by the diaphragm 26, causes the plunger 154 to again move toward its closed position and seat against the valve seat 158 whereby inlet pressure P1 is metered across the upstream restrictor groove 180 raising the loading pressure PL and causing the main flow valve 120 to move towards closing.

As may be recognized, the amount of opening and closing of the main flow valve liner 120a is proportional to the amount of opening and closing of the pilot valve 10a such that the back pressure pilot 10a will provide pressure limiting throttling control of upstream pressure P1 throughout its operating range.

As with the pressure reducing pilot 10, the back pressure monitoring pilot 10a the restrictor groove 180 on the outer surface of the barrel portion 155 of the plunger 154, is self-cleaned by the wiping action of the barrel portion 155 within the aperture 164 of the guide bushing 152. As such, dirt particles accumulating within the restrictor groove 180 are dislodged during successive operation of the pilot 10a and proceed through the port 18 and into the downstream pressure line P2.

Additionally the back pressure monitoring pilot 10a provides rapid venting of the loading pressure PL during opening and withstand the heavy spring forces encountered during closing. This result is made possible by the base of the conical-shaped projection 182 being only slightly larger in diameter than the valve seat 158.

With large closing forces, the valve seat insert 150 in the area of the seat 158 will deform slightly allowing the large end face 184 of the plunger to abut the face of the valve seat insert 150. Thus, the closing forces exerted by the spring 100 are distributed across a major portion of the valve seat insert 150. Such force distribution prevents degradation of the annular valve seat 158 and insures proper valving within the pilot valve 10A during prolonged use.

Because of the converging flow path from the loading chamber 170 to the center of the plunger seat 158, the effect of high velocity attachment between the plunger and seat is not a factor in the valve operation. That is, the liklihood of chatter is minimized.

Thus, in summary, it will be recognized that the present invention provides a significantly improved pilot valve which, in pressure reducing applications, eliminates chattering by the incorporation of integrally formed self-cleaning restrictors and reduces phase lag by the development of a positive feedback force. Additionally, by the mere substitution of interchangeable valve seat insert, bushing guide insert, and plunger, the pilot of the present invention may be effectively utilized in back pressure monitoring applications. It will be recognized that, although for purposes of illustration, specific part configuration and materials have been defined in the specification changes in design and other materials may be utilized in the pilot valve without departing from the spirit of the present invention.

I claim:

1. A pressure reducing pilot valve for controlling a main valve of the type having an upstream flow port, a downstream flow port and a control port, said pilot valve comprising:

a housing defining a downstream pressure region adapted to communicate with the main valve downstream flow port, an upstream pressure region adapted to communicate with the main valve upstream flow port, and a loading pressure region disposed between said downstream and upstream pressure regions and adapted to communicate with the main valve control port;

a valve seat separating said downstream pressure region and said loading pressure region;

pressure responsive means in said housing adapted to communicate with the main valve downstream flow port and including a member movable in response to downstream pressure variations;

a poppet connected to said movable member;

valve means on said poppet including a tapered valve surface movable with respect to said valve seat to control flow between said loading pressure region and said downstream pressure region;

the larger portion of said tapered valve surface being disposed in said loading pressure region and the smaller portion of said tapered valve surface being disposed in said downstream pressure region;

said valve means also including means separating said upstream pressure region and said loading pressure region, said separating means including a pressure responsive surface of substantially constant effective area exposed to upstream pressure in said upstream pressure region; and a restricted flow passage between said upstream pressure region and said loading pressure region.

2. A pressure reducing pilot valve as claimed in claim 1, further comprising a cylindrical passage extending between said upstream pressure region and said loading pressure region, said separating means comprising a cylindrical portion of said valve means slidably received in said cylindrical passage.

3. A pressure reducing pilot valve as claimed in claim 2, said restricted flow passage being defined between interfacing walls of said cylindrical passage and said cylindrical portion.

4. A pressure reducing pilot as claimed in claim 2, said restricted flow passage comprising a groove in said cylindrical portion.

5. A pressure reducing pilot valve as claimed in claim 1, said pressure responsive means including a diaphragm constituting said movable member, biasing means for applying predetermined force to one side of the diaphragm, and a cavity at the opposite side of the diaphragm adapted to communicate with the main valve downstream flow port.

6. A pressure reducing pilot valve as claimed in claim 5 further comprising a restricted flow path extending between said downstream pressure region and said cavity.

7. A pressure reducing pilot valve as claimed in claim 6, further comprising a poppet guide aperture, said poppet including a stem portion movable in said aperture, and said restricted flow path being defined by a clearance between said aperture and said stem portion.

8. A pressure reducing pilot valve as claimed in claim 1 wherein said valve seat is circular and said tapered valve surface is conical.

9. A pilot valve for controlling a main valve of the type having two main flow ports and a control port, said pilot valve comprising:

a housing defining first and second regions adapted to communicate respectively with the main valve main flow ports and defining a loading pressure region disposed between said first and second regions and adapted to communicate with the main valve control port;

a valve seat separating said first region and said loading pressure region;

pressure responsive means in said housing adapted to communicate with one of the main valve main flow ports and including a member movable in response to downstream pressure variations at said one main flow port;

a poppet connected to said movable member;

valve means on said poppet including a tapered valve surface movable with respect to said valve seat to control flow between said loading pressure region and said first region;

the larger portion of said tapered valve surface being disposed in said loading pressure region and the smaller portion of said tapered valve surface being disposed in said first region;

said valve means also including means separating said second region and said loading pressure region, said separating means including a pressure responsive surface of substantially constant effective area exposed to upstream pressure in said second region; and a restricted flow passage between said second region and said loading pressure region.

10. A pilot valve as claimed in claim 9, further comprising a cylindrical passage extending between said second region and said loading pressure region, said separating means comprising a cylindrical portion of said valve means slidably received in said cylindrical passage.

11. A pilot valve as claimed in claim 10, said restricted flow passage being defined between interfacing walls of said cylindrical passage and said cylindrical portion.

12. A pilot as claimed in claim 11, said restricted flow passage comprising a groove in said cylindrical portion.

13. A pilot valve as claimed in claim 9, said pressure responsive means including a diaphragm constituting said movable member, biasing means for applying predetermined force to one side of the diaphragm, and a cavity at the opposite side of the diaphragm adapted to communicate with said one main valve flow port.

14. A pilot valve as claimed in claim 13 further comprising a restricted flow path extending between said first region and said cavity.

15. A pilot valve as claimed in claim 14, further comprising a poppet guide aperture, said poppet including a stem portion movable in said aperture, and said restricted flow path being defined by a clearance between said aperture and said stem portion.

16. A pilot valve as claimed in claim 9 wherein said valve seat is circular and said tapered valve surface is conical.

* * * * *